United States Patent
Oya et al.

(10) Patent No.: US 12,438,420 B2
(45) Date of Patent: Oct. 7, 2025

(54) ELECTRIC MOTOR, AIR CONDITIONER, AND CONTROL BOARD

(71) Applicant: Mitsubishi Electric Corporation, Tokyo (JP)

(72) Inventors: Junichiro Oya, Tokyo (JP); Mineo Yamamoto, Tokyo (JP); Hiroyuki Ishii, Tokyo (JP); Hiroki Aso, Tokyo (JP); Yoshiyuki Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 139 days.

(21) Appl. No.: 18/554,489

(22) PCT Filed: Jun. 18, 2021

(86) PCT No.: PCT/JP2021/023218
§ 371 (c)(1),
(2) Date: Oct. 9, 2023

(87) PCT Pub. No.: WO2022/264407
PCT Pub. Date: Dec. 22, 2022

(65) Prior Publication Data
US 2024/0204626 A1 Jun. 20, 2024

(51) Int. Cl.
*H02K 11/33* (2016.01)
*F24F 1/38* (2011.01)
(Continued)

(52) U.S. Cl.
CPC ............ *H02K 11/33* (2016.01); *F24F 1/38* (2013.01); *F24F 11/88* (2018.01); *H02K 1/18* (2013.01);
(Continued)

(58) Field of Classification Search
CPC ...... H02K 11/33; H02K 11/0094; H02K 1/18; H02K 2211/03; F24F 1/38; F24F 11/88; H02P 25/16
See application file for complete search history.

(56) References Cited

FOREIGN PATENT DOCUMENTS

| JP | 2005-219625 A | 8/2005 | |
|---|---|---|---|
| JP | 2016077092 A | * 5/2016 | |
| WO | WO-2018078719 A1 | * 5/2018 | ............... H02P 27/06 |

OTHER PUBLICATIONS

International Search Report of the International Searching Authority mailed Aug. 24, 2021 issued in corresponding International Patent Application No. PCT/JP2021/023218 (and English translation).

* cited by examiner

*Primary Examiner* — Emmanuel E Duke
(74) *Attorney, Agent, or Firm* — Posz Law Group, PLC

(57) ABSTRACT

An electric motor includes: a stator; a rotor; and a built-in board that supplies current to the stator, wherein the built-in board includes: a high-voltage circuit connected to a high-voltage power supply; and a low-voltage circuit connected to a low-voltage power supply, the high-voltage circuit includes an inverter that converts an input direct-current voltage into an alternating-current voltage and supplies the alternating-current voltage to the stator, the low-voltage circuit includes a control unit that controls the inverter, and an inductor is disposed on a low-voltage power-supply line that is a line connecting the low-voltage power supply and the low-voltage circuit.

17 Claims, 10 Drawing Sheets

(51) Int. Cl.
*F24F 11/88* (2018.01)
*H02K 1/18* (2006.01)
*H02K 11/00* (2016.01)
(52) U.S. Cl.
CPC ...... *H02K 11/0094* (2013.01); *H02K 2211/03* (2013.01)

ELECTRIC MOTOR, AIR CONDITIONER, AND CONTROL BOARD

CROSS REFERENCE TO RELATED APPLICATION

This application is a U.S. national stage application of PCT/JP2021/023218 filed on Jun. 18, 2021, the contents of which are incorporated herein by reference.

FIELD

The present disclosure relates to an electric motor including an inverter, an air conditioner, and a control board.

BACKGROUND

Control of a conventional brushless direct-current (DC) motor is a control that can be achieved by a simple circuit configuration (including only a combinational circuit), such as 120-degree conduction control. Therefore, noise is hardly generated by a power supply circuit. In brushless DC motor control of recent years, complicated control such as 150-degree conduction control, sine-wave conduction control, phase control, or sensorless control is performed. As a result, the complexity of a circuit configuration of a control unit increases, and clock frequency also increases. This leads to generation of a large amount of noise.

In the electric motor described in Patent Literature 1, noise is removed by an inductor connected to a power-supply line between a power-supply receiving unit of a microcomputer and a reference-voltage power-supply circuit that outputs a high voltage.

PATENT LITERATURE

Patent Literature 1: Japanese Patent Application Laid-open No. 2005-219625

However, the technique of Patent Literature 1 described above has a problem in that noise reduction measures are taken only for the reference-voltage power-supply circuit that outputs a high voltage, resulting in insufficient noise reduction.

SUMMARY

The present disclosure has been made in view of the above, and an object of the present disclosure is to obtain an electric motor capable of sufficiently reducing noise.

In order to solve the above-described problem and achieve the object, an electric motor of the present disclosure includes: a stator; a rotor; and a control board that supplies current to the stator. The control board includes: a high-voltage circuit connected to a high-voltage power supply; and a low-voltage circuit connected to a low-voltage power supply. The high-voltage circuit includes an inverter that converts an input direct-current voltage into an alternating-current voltage and supplies the alternating-current voltage to the stator, the low-voltage circuit includes a control unit that controls the inverter, and a first inductor is disposed on a low-voltage power-supply line that is a line connecting the low-voltage power supply and the low-voltage circuit.

The electric motor according to the present disclosure has an effect of enabling noise to be sufficiently reduced.

DETAILED DESCRIPTION

Hereinafter, an electric motor, an air conditioner, and a control board according to embodiments of the present disclosure will be described in detail with reference to the drawings.

First Embodiment

Figure 1:
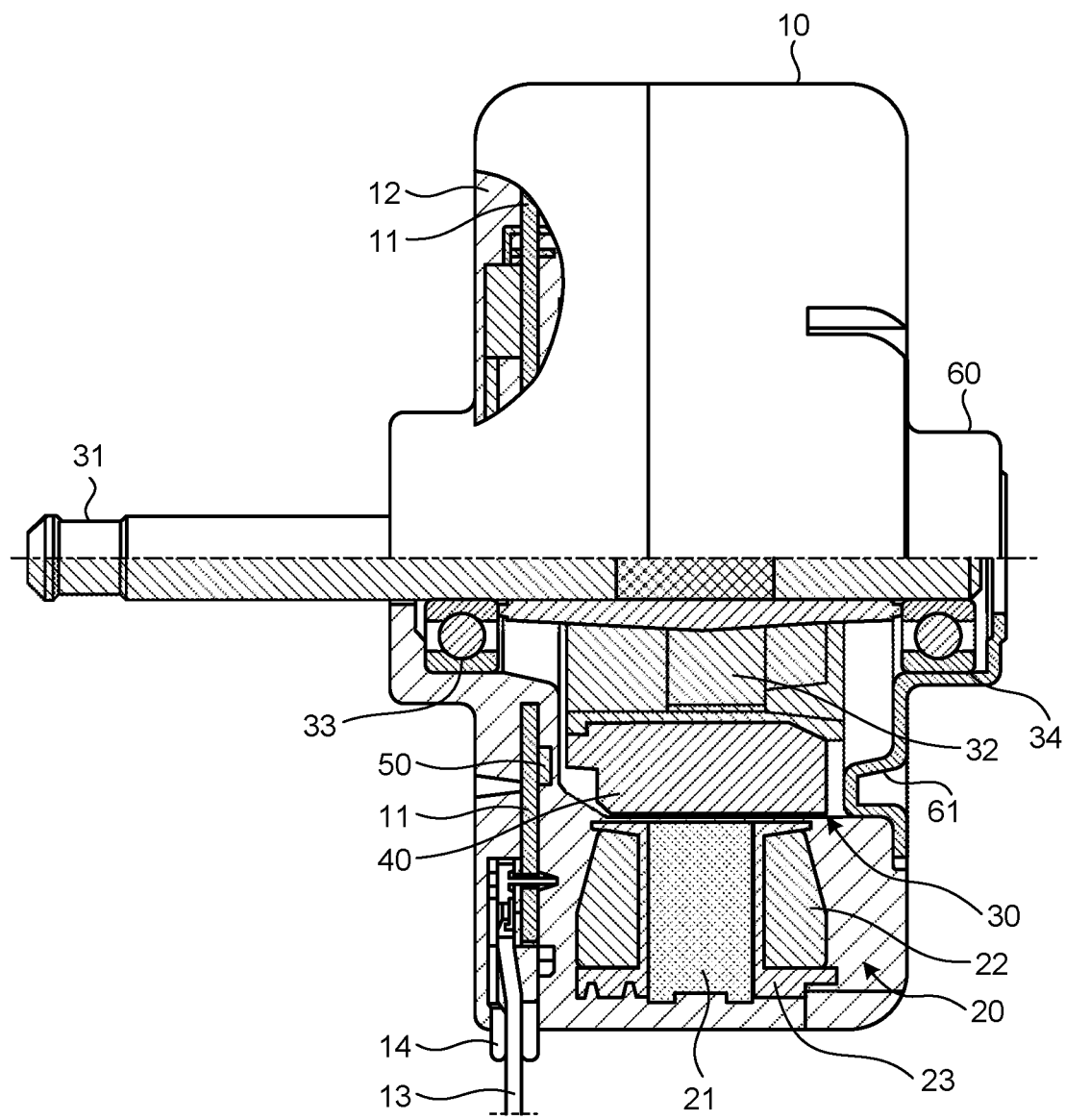
FIG. 1 is a diagram showing a configuration example of an electric motor according to a first embodiment.

FIG. 1 is a diagram showing a configuration example of an electric motor according to a first embodiment. An electric motor 1 is a brushless DC motor. In FIG. 1, the electric motor 1 is partially illustrated in cross section for describing the configuration of the electric motor 1. Note that although FIG. 1 illustrates a radial-gap brushless DC motor, the electric motor 1 of the first embodiment is not limited to the radial-gap brushless DC motor.

The electric motor 1 includes a rotor 30, a stator 20, a built-in board 11, and a molding resin 12. The built-in board 11 is a control board. A rotating shaft 31 is inserted in the rotor 30. The stator 20 is provided on an outer periphery of the rotor 30. The built-in board 11 includes a plated circuit that is a circuit that controls the driving of the rotor 30.

The stator 20, the built-in board 11, and the molding resin 12 are fixed by a molded stator 10. The stator 20 and the built-in board 11 are integrally molded by the molded stator 10. That is, the stator 20 and the built-in board 11 are fixed by the molded stator 10 so that the stator 20 and the built-in board 11 are integrated with each other. A recess is provided in the molded stator 10. The recess is formed such that the rotor 30 can be accommodated in the recess.

The built-in board 11 is integrated with the stator 20 by the molding resin 12 (resin having a relative permittivity of, for example, 3 to 4) having a permittivity higher than the permittivity of air. Therefore, capacitive coupling (parasitic capacitance) between board patterns formed on the built-in board 11 increases, so that noise easily propagates between the board patterns. In the first embodiment, even when noise easily propagates as described above, noise is reduced by an inductor to be described below.

The stator 20 includes a plurality of stator cores 21, an insulator 23, and a winding 22. The insulator 23 is integrally molded with the stator cores 21. The stator cores 21 each include magnetic steel sheets laminated together. The insulator 23 insulates the stator cores 21 from the winding 22.

In the electric motor 1, the winding 22 is wound around the stator cores 21, which is integrally molded with the insulator 23, through each slot of the stator cores 21 to form the stator 20. The winding 22 is made of copper, aluminum, or the like.

An output-side bearing 33 that rotatably supports the rotating shaft 31 is provided on one end of the rotating shaft 31. A counter-output-side bearing 34 that rotatably supports the rotating shaft 31 is provided on another end of the rotating shaft 31.

The counter-output-side bearing 34 is covered with a bracket 60 that is electrically conductive. The bracket 60 is configured such that a press-fitted portion 61 of the bracket 60 is fitted into an inner peripheral portion of the molded stator 10 in such a way as to cover an opening of the recess provided in the molded stator 10. In addition, an outer ring of the counter-output-side bearing 34 is fitted into the bracket 60.

The built-in board 11 includes a circuit including a power integrated circuit (IC) (power IC 80 to be described below), a control unit 70 to be described below, and a magnetic sensor 50. The power IC 80 supplies power to the winding 22. The magnetic sensor 50 detects the position of the rotor 30.

The built-in board 11 is disposed perpendicular to a direction of an axis of the rotating shaft 31, between the output-side bearing 33 and the stator 20, and is fixed to the insulator 23. Furthermore, the plated circuit of the built-in board 11 and the winding 22 are connected via a winding terminal. A lead exit portion 14 is disposed on the built-in board 11. A lead wire 13 connecting to a host system is drawn from the lead exit portion 14. The host system is a system including the electric motor 1. For example, the lead wire 13 is connected to a board (such as an indoor-unit board 211 to be described below) on a unit side of an air conditioner. In addition, passive elements such as an operational amplifier, a comparator, a regulator, a diode, a resistor, a capacitor, and a fuse are disposed on the built-in board 11.

The built-in board 11 has a disk shape, and has a through hole formed in the center. The rotating shaft 31 is passed through the through hole provided in the built-in board 11. The built-in board 11 is disposed inside the electric motor 1 such that an upper surface and a bottom surface are perpendicular to the direction of the axis of the rotating shaft 31.

A rotor insulating portion 32 which is an annular member is disposed on an outer peripheral portion of the rotating shaft 31. The rotor 30 includes a magnet 40 disposed inside the molded stator 10. The magnet 40 is located in such a way as to face the stator cores 21, on an outer peripheral side of the rotating shaft 31 and the rotor insulating portion 32. The magnet 40 includes a cylindrical permanent magnet. The magnet 40 is fixed to the rotating shaft 31.

The magnet 40 is produced by injection molding of a ferrite magnet or a bonded magnet formed by a mixture of a rare-earth magnet (a samarium-iron-nitrogen magnet, a neodymium magnet, or the like) with a thermoplastic resin material. A magnet is built into a metal mold for injection molding of the magnet 40, and the magnet 40 is molded while being oriented.

The magnet 40 includes a sensor-magnet portion and a main-magnet portion in the direction of the axis of the rotating shaft 31. The sensor-magnet portion is part of the magnet 40 closer to the magnetic sensor 50. The rest of the magnet 40 serves as the main-magnet portion. The sensor-magnet portion causes the magnetic sensor 50 to detect the position of the rotor 30. The main-magnet portion causes the rotor 30 to generate a turning force according to magnetic flux generated by the winding 22.

The magnet 40 is smaller in outer diameter on a side closer to the magnetic sensor 50 of the built-in board 11. That is, in the magnet 40, the outer diameter of the sensor-magnet portion is smaller than the outer diameter of the main-magnet portion. This shape of the magnet 40 allows magnetic flux to easily flow into the magnetic sensor 50 mounted on the built-in board 11. In order to minimize the effect of the magnetic flux generated by the winding 22 of the stator 20, the magnetic sensor 50 is located away from the winding 22, that is, located closer to the rotating shaft 31.

Note that although FIG. 1 illustrates a case where the main-magnet portion and the sensor-magnet portion are included in the single magnet 40, the main-magnet portion and the sensor-magnet portion may be provided as separate magnets.

A Hall IC that outputs digital signals may be used as the magnetic sensor 50. Alternatively, a Hall element that outputs analog signals may be used as the magnetic sensor 50. That is, the magnetic sensor 50 may detect the position of the rotor 30 by using a Hall IC, or may detect the position of the rotor 30 by using a Hall element.

In addition, the Hall IC may be a Hall IC (Hall IC of a first method) that detects the position of the rotor 30 by the first method, or may be a Hall IC (Hall IC of a second method) that detects the position of the rotor 30 by the second method.

In the Hall IC of the first method, a sensor portion and an amplification portion are formed of separate semiconductor chips. In the Hall IC of the first method, the sensor portion is made of a semiconductor other than silicon, and the amplification portion is made of silicon. Hereinafter, the Hall IC of the first method is referred to as a non-silicon Hall IC. In the Hall IC of the second method, a sensor portion and an amplification portion are included in a single silicon semiconductor chip.

Two chips are built into the non-silicon Hall IC. Therefore, the sensor portion is disposed such that the center of the sensor portion does not coincide with the center of an IC body. A non-silicon semiconductor such as indium antimonide (InSb) is used for the sensor portion of the non-silicon Hall IC. Non-silicon semiconductors are advantageous in that non-silicon semiconductors have better sensitivity than silicon semiconductors, and that offset due to stress strain in non-silicon semiconductors is smaller than in silicon semiconductors.

Figure 2:
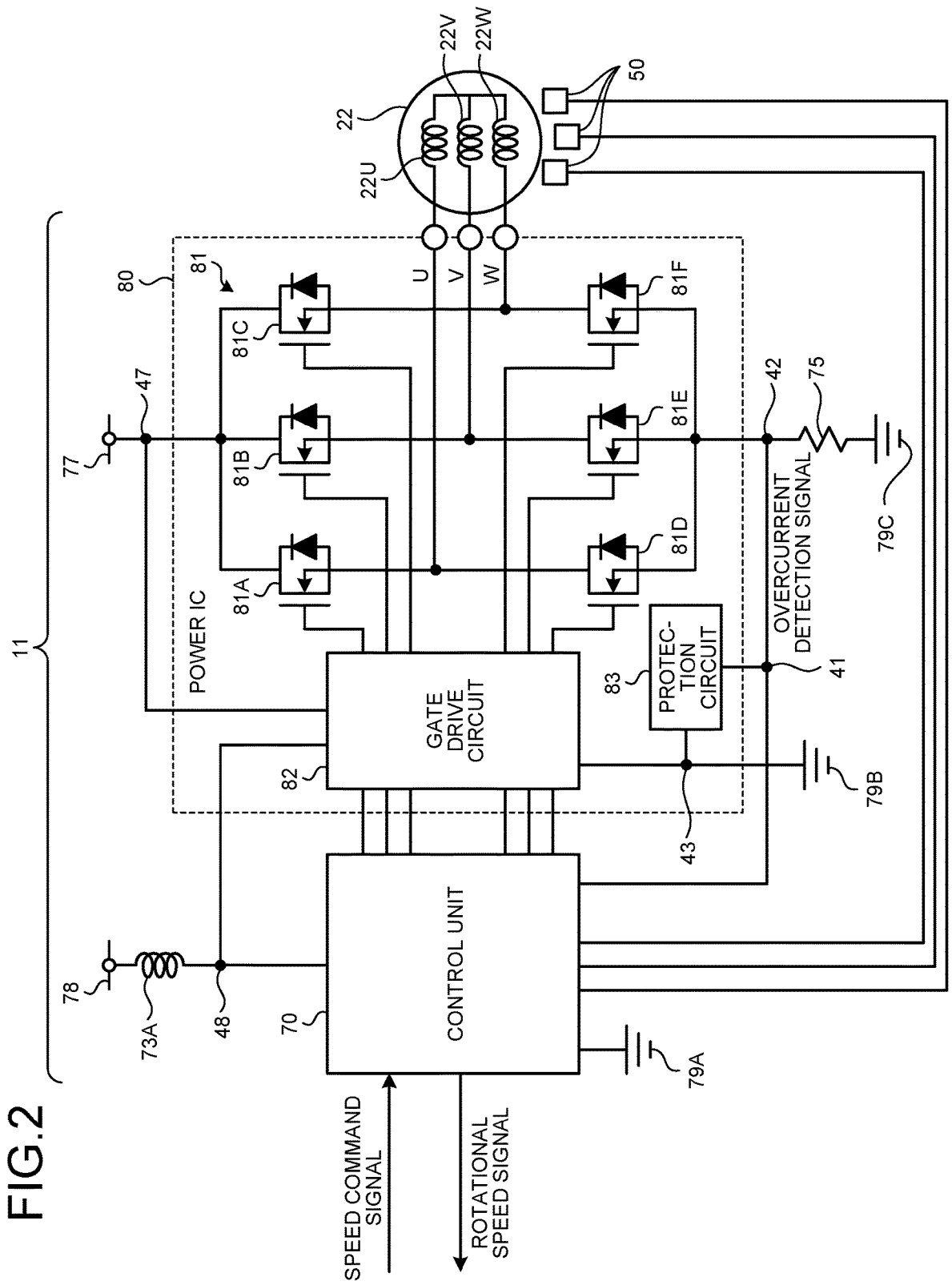
FIG. 2 is a diagram illustrating a circuit configuration of a built-in board included in the electric motor according to the first embodiment.

Next, a circuit configuration of the built-in board 11 illustrated in FIG. 1 will be described. FIG. 2 is a diagram illustrating a circuit configuration of the built-in board included in the electric motor according to the first embodiment. FIG. 2 illustrates the built-in board 11, the winding 22, and the magnetic sensors 50.

The built-in board 11 includes an inductor 73A disposed on a low-voltage power-supply line as a countermeasure against noise. Details of the inductor 73A provided as a countermeasure against noise will be described below.

The built-in board 11 includes an inverter IC and an overcurrent detection resistor 75. The inverter IC controls the driving of the electric motor 1 including the winding 22. Specifically, the built-in board 11 includes the power IC 80, the control unit 70, and the overcurrent detection resistor 75. The power IC 80 includes an inverter 81, a gate drive circuit 82, and a protection circuit 83.

The control unit 70 is connected to the host system, the gate drive circuit 82, a ground 79A, and the magnetic sensors 50. Furthermore, the control unit 70 is connected to a low-voltage power supply 78 via a connection point 48. The inductor 73A is disposed between the connection point 48 and the low-voltage power supply 78. That is, the control unit 70 is connected to the low-voltage power supply 78 via the connection point 48 and the inductor 73A. In addition, the control unit 70 is connected to a ground 79C via a connection point 41, a connection point 42, and the overcurrent detection resistor 75.

The gate drive circuit 82 is connected to the low-voltage power supply 78 via the connection point 48 and the inductor 73A, and is connected to a high-voltage power supply 77 via a connection point 47. The low-voltage power supply 78 outputs a voltage lower than a voltage of the high-voltage power supply 77. The high-voltage power supply 77 is a bus power supply.

Furthermore, the gate drive circuit 82 is connected to the inverter 81. In addition, the gate drive circuit 82 is connected to the protection circuit 83 and a ground 79B via a connection point 43.

The protection circuit 83 is connected to the connection point 41 and the connection point 43. That is, the protection circuit 83 is connected to the ground 79C via the connection point 41, the connection point 42, and the overcurrent detection resistor 75. In addition, the protection circuit 83 is connected to the ground 79B via the connection point 43.

The inverter 81 is connected to the electric motor 1 including the winding 22. In addition, the inverter 81 is connected to the ground 79C via the connection point 42 and the overcurrent detection resistor 75. The grounds 79A to 79C are common grounds having the same potential. In the following description, the grounds 79A to 79C are collectively referred to as a ground 79.

The power IC 80 is also referred to as an intelligent power module (IPM). The inverter 81 includes six power transistors 81A to 81F.

In the power IC 80, the six power transistors 81A to 81F may be separately provided, or may be provided as a single IC. In a case where the six power transistors 81A to 81F are separately provided, the gate drive circuit 82 may be provided as a single IC, or may include three ICs provided separately for three phases. In addition, the gate drive circuit 82 and the control unit 70 may be provided as a single IC. Furthermore, the control unit 70 may include a single dedicated IC (control IC), or may include a microcomputer (hereinafter, referred to as a microcomputer) or the like.

The power transistors 81A to 81F each include a superjunction metal oxide semiconductor field effect transistor (MOSFET), a planar MOSFET, an insulated gate bipolar transistor (IGBT), or the like.

In the first embodiment, a description will be given of a case where the magnetic sensor 50 detects positions of magnetic poles of the rotor 30 corresponding to a position of magnetic flux, and the built-in board 11 controls the electric motor 1 based on the positions of the magnetic poles. Note that the built-in board 11 may perform sensorless control of the electric motor 1 while estimating the positions of the magnetic poles from a current flowing through the winding 22 and voltages applied to and generated by the winding 22. Furthermore, in order to detect a current, the built-in board 11 may amplify a current signal obtained by use of a shunt resistor and a current sensor, with an operational amplifier or the like. In addition, the built-in board 11 may use a comparator to generate, from the current signal, a signal for overcurrent protection to be provided to the control unit 70.

On the built-in board 11, a voltage (for example, 15 V) for driving the gates of the power transistors 81A to 81F may be different from a microcomputer power-supply voltage (for example, 5 V) that is a voltage for driving the control unit 70 such as a microcomputer. In this case, the electric motor 1 uses a regulator to generate another power supply from one power supply provided from the outside. For example, a power supply of 15 V is provided to the built-in board 11 from the outside, and the regulator generates a power supply of 5 V and provides the power supply to the built-in board 11. The regulator may be built into the gate drive circuit 82 or the power IC 80.

The inverter 81 converts an input direct-current voltage into an alternating-current voltage for three phases including a U phase, a V phase, and a W phase, and supplies the alternating-current voltage to the winding 22 of the stator 20. The power transistor 81A is a U-phase upper-arm power transistor. The power transistor 81B is a V-phase upper-arm power transistor. The power transistor 81C is a W-phase upper-arm power transistor. The power transistor 81D is a U-phase lower-arm power transistor. The power transistor 81E is a V-phase lower-arm power transistor. The power transistor 81F is a W-phase lower-arm power transistor.

The electric motor 1 includes, as the winding 22, a U-phase winding 22U, a V-phase winding 22V, and a W-phase winding 22W. The U-phase winding 22U is connected to the power transistors 81A and 81D. The V-phase winding 22V is connected to the power transistors 81B and 81E. The W-phase winding 22W is connected to the power transistors 81C and 81F.

The gate drive circuit 82 controls the turning-on and turning-off of the power transistors 81A to 81F according to switching signals received from the control unit 70.

Three magnetic sensors 50 are disposed around the winding 22. Each of the three magnetic sensors 50 outputs, to the control unit 70, a magnetic-pole position signal corresponding to the position of the rotor 30.

The protection circuit 83 protects the inverter 81 and the gate drive circuit 82. For example, the protection circuit 83 prevents a high current from flowing back to the gate drive circuit 82 from the ground 79. In addition, when at least one of the inverter 81 and the gate drive circuit 82 has a high temperature, the protection circuit 83 turns off all the power transistors 81A to 81F of the inverter 81 to prevent element destruction due to high temperature.

The overcurrent detection resistor 75 is connected to lower-arm switches included in the power transistors 81D to 81F. In addition, the built-in board 11 includes an overcurrent detection unit (not illustrated) that detects an overcurrent. The overcurrent detection unit prevents an overcurrent from flowing through the winding 22 and achieves overcurrent protection by monitoring the voltage of the overcurrent detection resistor 75 so as to turn off the power transistors 81A to 81F when the voltage of the overcurrent detection resistor 75 reaches or exceeds a specific voltage value. When a voltage across the overcurrent detection resistor 75 reaches or exceeds the specific voltage value, an overcurrent detection signal to be input from the overcurrent detection resistor 75 to the control unit 70 is output. The overcurrent detection unit achieves overcurrent protection based on the overcurrent detection signal. Note that the overcurrent detection unit may be built into the control unit 70, or may be built into the gate drive circuit 82.

Note that a temperature-sensitive element (not illustrated) may be provided on the built-in board 11 or the like. In this case, when receiving a signal indicating an anomalous temperature from the temperature-sensitive element, the control unit 70 forcibly turns off the power transistors 81A to 81F.

The control unit 70 generates switching signals for controlling the turning-on and turning-off of the power transistors 81A to 81F at a specific frequency (hereinafter, referred to as a carrier frequency) according to a speed command signal received from the host system.

The control unit 70 performs pulse width modulation (PWM) control on the power transistors 81A to 81F by outputting the switching signals to the gate drive circuit 82. The control unit 70 estimates positions of the magnetic poles of the rotor 30 based on the magnetic-pole position signal input from the magnetic sensor 50, and calculates a rotational speed of the rotor 30 from the estimated positions of the magnetic poles. The control unit 70 outputs a rotational speed signal indicating the calculated rotational speed to the host system.

Note that the control unit 70 may be a dedicated IC such as an application specific integrated circuit (ASIC). Furthermore, the control unit 70 may include a memory that stores a program and a central processing unit (CPU) that executes processing according to the program. A hardware configuration of the control unit 70 will be described below.

In the case of three phases, the electric motor 1, which is a brushless DC motor, obtains rotational power by switching the six power transistors 81A to 81F at appropriate timings according to the positions of the magnetic poles of the magnet 40 of the rotor 30. Switching signals to be used for the switching are generated by the control unit 70. The operation principle of the electric motor 1 will be described.

In the electric motor 1, the control unit 70 estimates the positions of the magnetic poles of the rotor 30 based on the magnetic-pole position signal from the magnetic sensor 50 or a value of current flowing through the winding 22. The control unit 70 generates switching signals for switching the power transistors 81A to 81F according to the positions of the magnetic poles of the rotor 30 and the speed command signal output from the host system. The gate drive circuit 82 performs switching between the turning-on and turning-off of the power transistors 81A to 81F according to the switching signals generated by the control unit 70.

For example, in the 120-degree conduction control, timings for the switching between the turning-on and turning-off of the six power transistors 81A to 81F coincide with the rising edge and falling edge of each of detection signals regarding detection by three Hall ICs. Therefore, in the 120-degree conduction control, the control unit 70 can be implemented by a combinational circuit requiring no clock.

Meanwhile, in the case of control requiring estimation of positions of magnetic poles, such as 150-degree conduction control, sine-wave conduction control, phase control, or sensorless control, the control unit 70 includes a complicated digital circuit including a clock. For example, timing between the rising edge and falling edge of each of the detection signals regarding detection by the three Hall ICs is finely estimated in estimation of positions of magnetic poles.

Sensorless control is control that does not use the magnetic sensor 50. In the sensorless control, positions of magnetic poles are estimated from a value of current detected by a current detection resistor, a current detection transformer, or the like, to perform control. That is, in the case of the sensorless control, the control unit 70 estimates positions of magnetic poles based on a current flowing through the winding 22 and a voltage applied to the winding 22, and thus, complicated processing and calculation are required. Therefore, in the case of the sensorless control, the complexity of the circuit of the control unit 70 further increases, and it is necessary to increase clock frequency in the control unit 70.

For example, in order to achieve noise reduction, higher efficiency, and stable control, the clock frequency of the control unit 70 is 100 times or more a carrier frequency that is a frequency at which the power transistors 81A to 81F are switched.

Next, the inductor 73A disposed on the built-in board 11 as a countermeasure against noise will be described. In the first embodiment, the inductor 73A is disposed on the low-voltage power-supply line of the built-in board 11 as a countermeasure against noise. Noise in the first embodiment refers to noise (electromagnetic interference (EMI)) generated by the electric motor 1 and a product equipped with the electric motor 1. This noise includes noise of a noise terminal voltage, noise of noise power, radiation noise, and the like.

The low-voltage power-supply line is a line connecting the low-voltage power supply 78 and a circuit (low-voltage circuit) that operates at a low voltage on the built-in board 11. In addition, an inductor may be disposed on a high-voltage power-supply line of the built-in board 11. The high-voltage power-supply line is a line connecting the high-voltage power supply 77 and a circuit (high-voltage circuit) that operates at a high voltage on the built-in board 11.

Furthermore, an inductor may be disposed on a ground (GND) line of the built-in board 11. The ground line is a line connecting the ground 79 and a circuit on the built-in board 11. Note that a ground line for a low-voltage circuit and a ground line for a high-voltage circuit may be separately disposed as ground lines on the built-in board 11.

Figure 3:
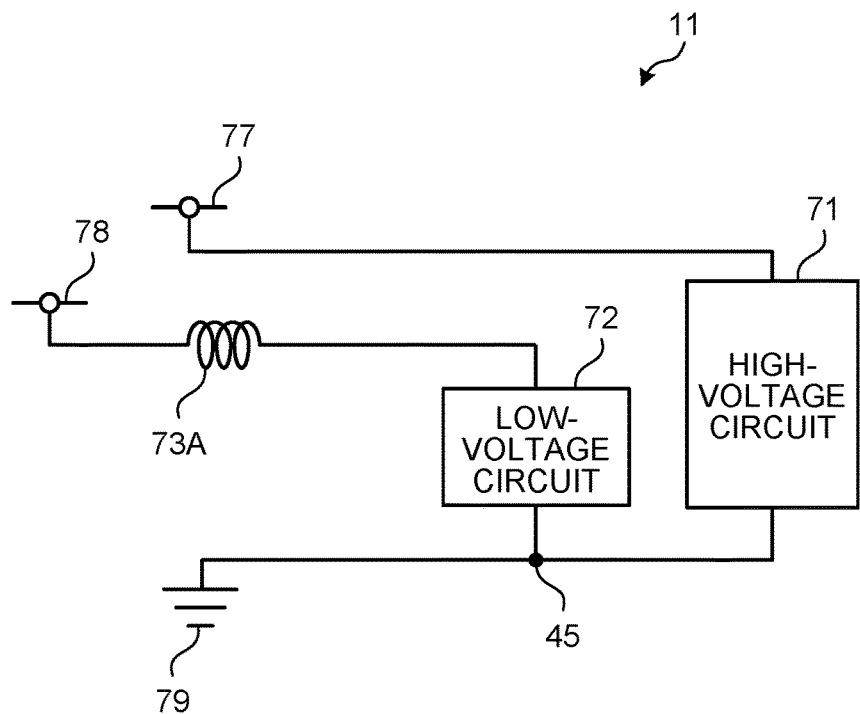
FIG. 3 is a diagram showing a first example of disposing an inductor on the built-in board according to the first embodiment.

FIG. 3 is a diagram showing a first example of disposing an inductor on the built-in board according to the first embodiment. On the built-in board 11, a low-voltage circuit 72 is connected to the low-voltage power supply 78, and a high-voltage circuit 71 is connected to the high-voltage power supply 77. In addition, the low-voltage circuit 72 and the high-voltage circuit 71 are connected to a connection point 45, and the connection point 45 is connected to the ground 79. The low-voltage circuit 72 includes, for example, a digital circuit including a sequential circuit.

The low-voltage circuit 72 includes a first circuit, the control unit 70, and the protection circuit 83. The first circuit is part of the gate drive circuit 82. The high-voltage circuit 71 includes a second circuit and the inverter 81. The second circuit is part of the gate drive circuit 82. In the gate drive circuit 82, the first circuit included in the low-voltage circuit 72 and the second circuit included in the high-voltage circuit 71 are different circuits.

In the first example of disposing an inductor on the built-in board 11, a single inductor, that is, the inductor 73A is disposed. The inductor 73A, which is a first inductor, is disposed on a low-voltage power-supply line connecting the low-voltage circuit 72 and the low-voltage power supply 78. With this configuration, the built-in board 11 can reduce noise generated on the built-in board 11 by means of the inductor 73A.

Figure 4:
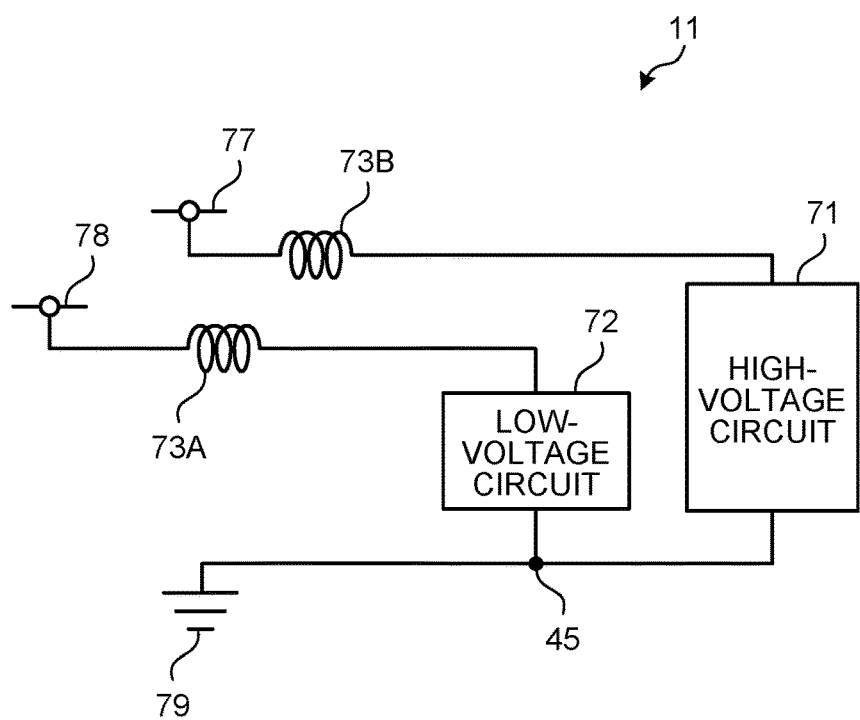
FIG. 4 is a diagram showing a second example of disposing inductors on the built-in board according to the first embodiment.

FIG. 4 is a diagram showing a second example of disposing inductors on the built-in board according to the first embodiment. In the second example of disposing inductors on the built-in board 11, two inductors 73A and 73B are disposed. The inductor 73B, which is a second inductor, is disposed on a high-voltage power-supply line connecting the high-voltage circuit 71 and the high-voltage power supply 77. With this configuration, the built-in board 11 can reduce noise generated on the built-in board 11 by means of the inductors 73A and 73B.

Figure 5:
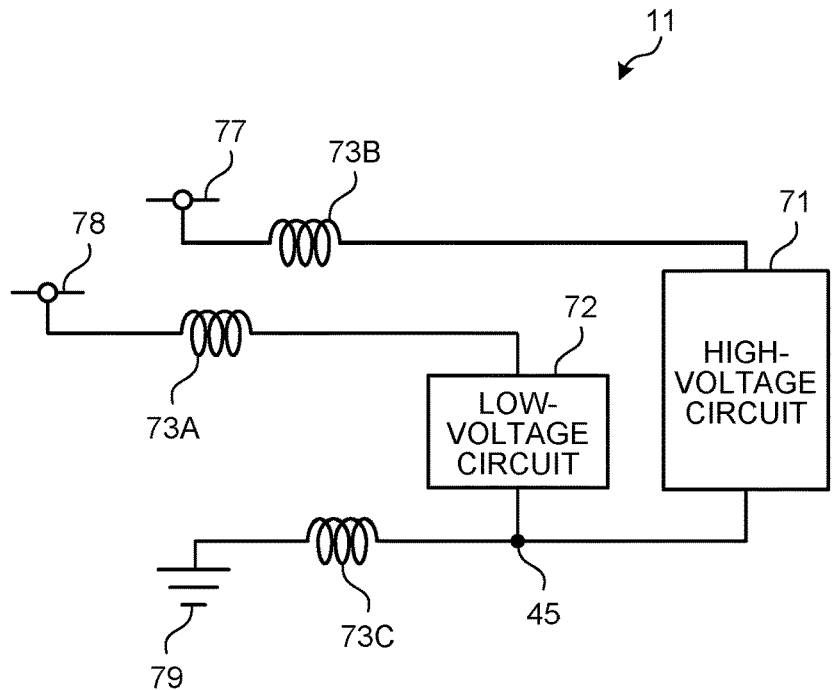
FIG. 5 is a diagram showing a third example of disposing inductors on the built-in board according to the first embodiment.

FIG. 5 is a diagram showing a third example of disposing inductors on the built-in board according to the first embodiment. In the third example of disposing inductors on the built-in board 11, three inductors 73A to 73C are disposed. The inductor 73C is disposed on a ground line connecting the connection point 45 and the ground 79. With this configuration, the built-in board 11 can reduce noise generated on the built-in board 11 by means of the inductors 73A to 73C.

Figure 6:
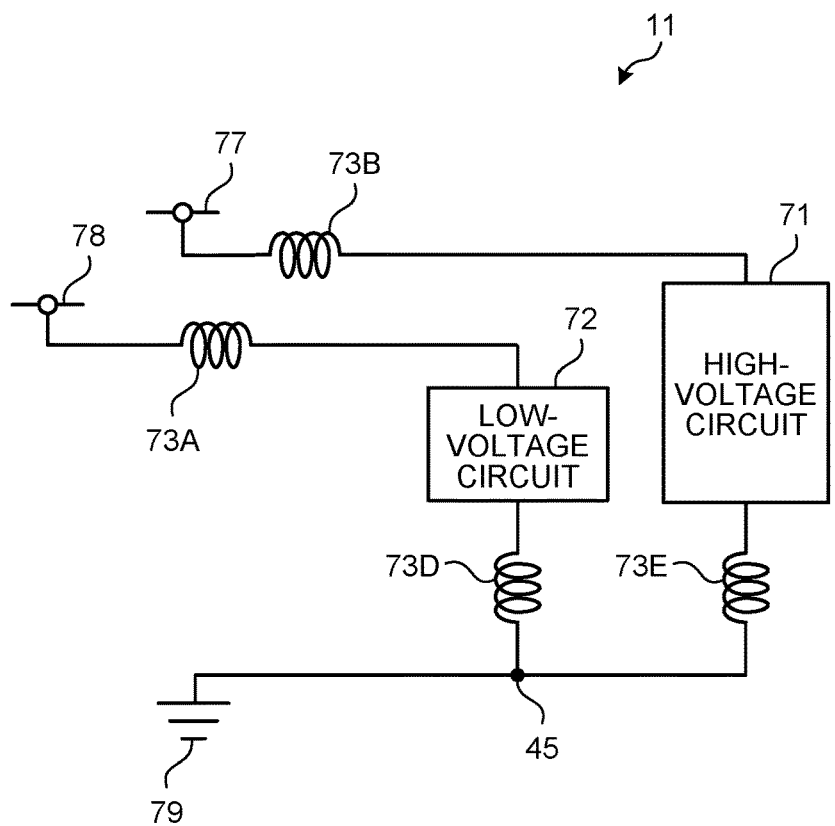
FIG. 6 is a diagram showing a fourth example of disposing inductors on the built-in board according to the first embodiment.

FIG. 6 is a diagram showing a fourth example of disposing inductors on the built-in board according to the first embodiment. In the fourth example of disposing inductors on the built-in board 11, four inductors 73A, 73B, 73D, and 73E are disposed. The inductor 73D is disposed on a ground line connecting the low-voltage circuit 72 and the connection point 45. The inductor 73E is disposed on a ground line connecting the high-voltage circuit 71 and the connection point 45. With this configuration, the built-in board 11 can reduce noise generated on the built-in board 11 by means of the inductors 73A, 73B, 73D, and 73E.

Figure 7:
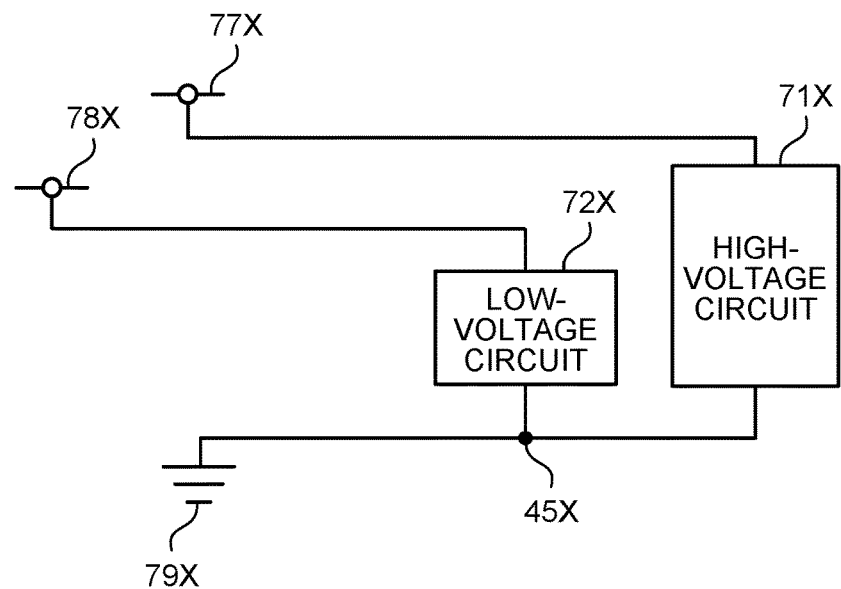
FIG. 7 is a diagram illustrating a circuit configuration of a built-in board of a comparative example.

FIG. 7 is a diagram illustrating a circuit configuration of a built-in board of a comparative example. The built-in board of the comparative example includes a low-voltage circuit 72X and a high-voltage circuit 71X. The low-voltage circuit 72X is a circuit similar to the low-voltage circuit 72, and the high-voltage circuit 71X is a circuit similar to the high-voltage circuit 71.

The low-voltage circuit 72X is connected to a low-voltage power supply 78X that is a power supply similar to the low-voltage power supply 78. The high-voltage circuit 71X is connected to a high-voltage power supply 77X that is a power supply similar to the high-voltage power supply 77. Furthermore, the low-voltage circuit 72X and the high-voltage circuit 71X are connected to a connection point 45X that is a connection point similar to the connection point 45, and the connection point 45X is connected to a ground 79X.

On the built-in board of the comparative example, no inductor is disposed on a low-voltage power-supply line connecting the low-voltage circuit 72X and the low-voltage power supply 78X. In addition, no inductor is disposed on a high-voltage power-supply line connecting the high-voltage circuit 71X and the high-voltage power supply 77X. Furthermore, no inductor is disposed on a ground line from the low-voltage circuit 72X to the ground 79X, and no inductor is disposed on a ground line from the high-voltage circuit 71X to the ground 79X. Therefore, the built-in board of the comparative example cannot reduce noise generated on the built-in board of the comparative example.

Figure 8:
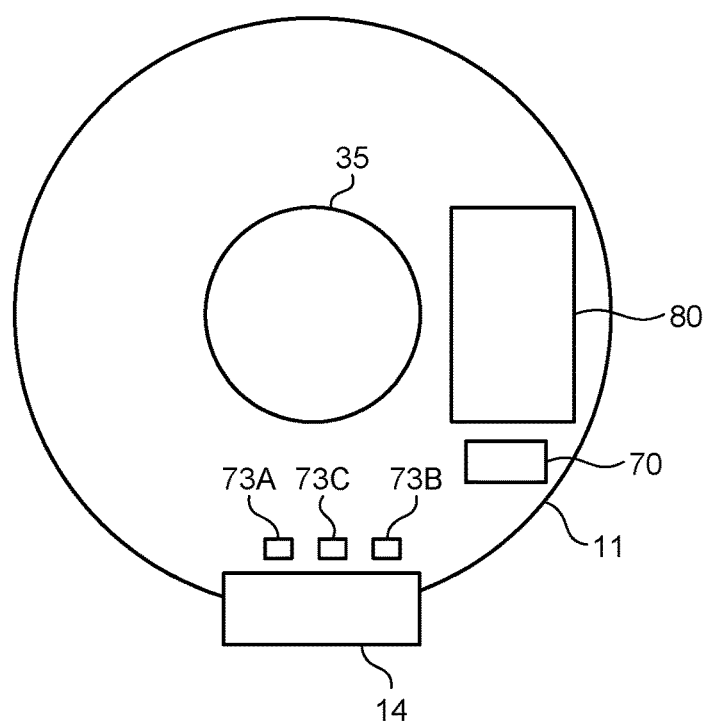
FIG. 8 is a diagram showing a first example of a configuration of an upper surface of the built-in board according to the first embodiment.

FIG. 8 is a diagram showing a first example of a configuration of an upper surface of the built-in board according to the first embodiment. The configuration of the upper surface of the built-in board 11 illustrated in FIG. 5 will be described with reference to FIG. 8. As illustrated in FIG. 8, the built-in board 11 has a disk shape, and has a through hole 35 formed in the center. The rotating shaft 31 is passed through the through hole 35.

The power IC 80, which supplies power to the winding 22, the inductors 73A to 73C, and the control unit 70 are disposed on the upper surface of the built-in board 11. Note that although not illustrated, the overcurrent detection resistor 75 and the like are disposed on the upper surface or bottom surface of the built-in board 11.

The inductors 73A to 73C are disposed closer to the lead exit portion 14 than to the power IC 80 including the power transistors 81A to 81F. That is, the inductors 73A to 73C are located such that distances to the lead exit portion 14 are shorter than distances to the power IC 80.

As a result, the inductors 73A to 73C are less likely to be affected by heat radiated by the power transistors 81A to 81F, so that temperature-induced changes in inductance values of the inductors 73A to 73C decrease. When an inductance value fluctuates, noise reduction effect decreases due to unmatched impedance or the like. Meanwhile, noise reduction effect increases in the first embodiment because a change in the inductance value is small. That is, the inductors 73A to 73C are less likely to be affected by heat radiated by the power transistors 81A to 81F. Therefore, the built-in board 11 can prevent noise removal performance from being changed by a change in an inductance value due to temperature characteristics of the inductors 73A to 73C.

In addition, since the inductors 73A to 73C are disposed closer to the lead exit portion 14 than to the power IC 80, wiring on the built-in board 11 is facilitated. As a result, the built-in board 11 can be reduced in size, and the manufacturing cost of the electric motor 1 can be reduced by the reduction in the size of the built-in board 11. In addition, since the length of wiring of the built-in board 11 is shortened by the reduction in the size of the built-in board 11, noise can be reduced.

Furthermore, in the case of an inductor having inductance negatively correlated with temperature, impedance generally decreases due to an increase in temperature, and thus noise reduction effect may be greatly deteriorated. Note that the case where inductance is negatively correlated with temperature is not limited to a case where inductance is negatively correlated with an entire temperature range, but also includes a case where inductance is negatively correlated with a temperature that falls within part of the temperature range (negatively correlated with a temperature of, for example, 60° C. or higher).

Figure 9:
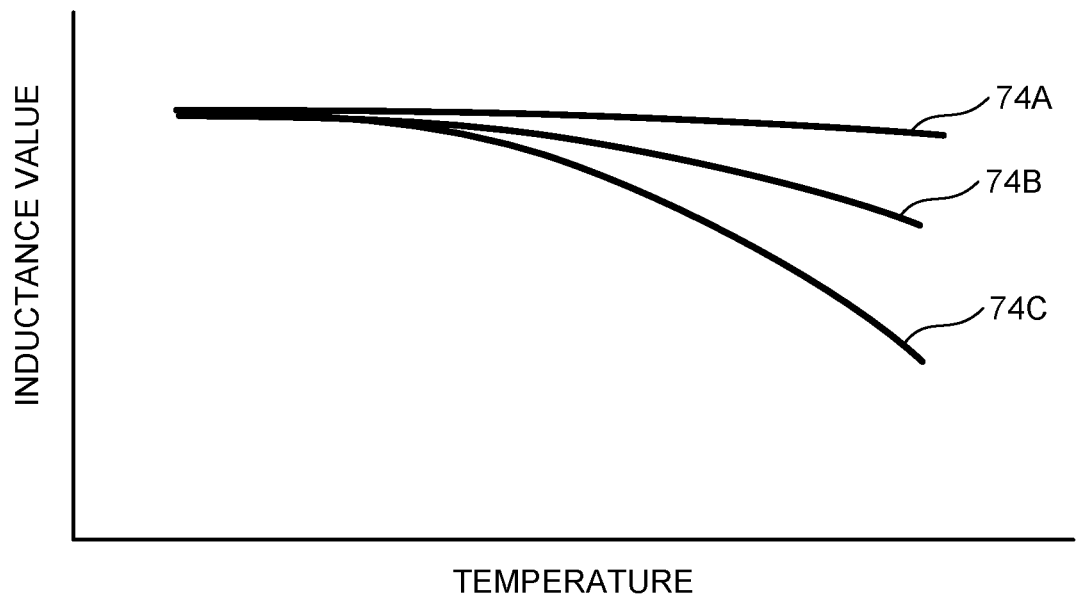
FIG. 9 is a diagram for describing a relationship between temperature and inductance values.

FIG. 9 is a diagram for describing a relationship between temperature and inductance values. In a graph illustrated in FIG. 9, the horizontal axis represents temperature, and the vertical axis represents the value of inductance. FIG. 9 illustrates an inductance temperature characteristic for each current magnitude.

An inductance temperature characteristic 74A is an inductance temperature characteristic to be obtained when a current having a first current value flows through an inductor. An inductance temperature characteristic 74B is an inductance temperature characteristic to be obtained when a current having a second current value flows through the inductor. An inductance temperature characteristic 74C is an inductance temperature characteristic to be obtained when a current having a third current value flows through the inductor. The following holds: first current value<second current value<third current value.

As shown by the inductance temperature characteristics 74A to 74C, impedance decreases as temperature increases in the case of an inductor having inductance negatively correlated with temperature.

Furthermore, as illustrated in FIG. 9, temperature dependence of the inductor increases as the value of current flowing through the inductor increases. In addition, in a case where a current flowing through the inductor is larger than a rated current, the saturation magnetic flux density of a magnetic material inside the inductor decreases, and a decrease in the inductance value due to a temperature rise increases, so that noise reduction effect tends to be further deteriorated.

In the first embodiment, since the inductors 73A to 73C are disposed closer to the lead exit portion 14 than to the power IC 80, a temperature rise can be prevented. Therefore, the built-in board 11 can prevent a decrease in impedance and maintain noise reduction effect.

Note that the case where the power IC 80 and the control unit 70 are provided as separate ICs has been described with reference to FIG. 8, but the power IC 80 and the control unit 70 may be provided as a single IC. Furthermore, in a case where the inductors 73D and 73E are disposed on the built-in board 11, the inductors 73D and 73E are disposed, for example, closer to the lead exit portion 14 than to the power IC 80.

Figure 10:
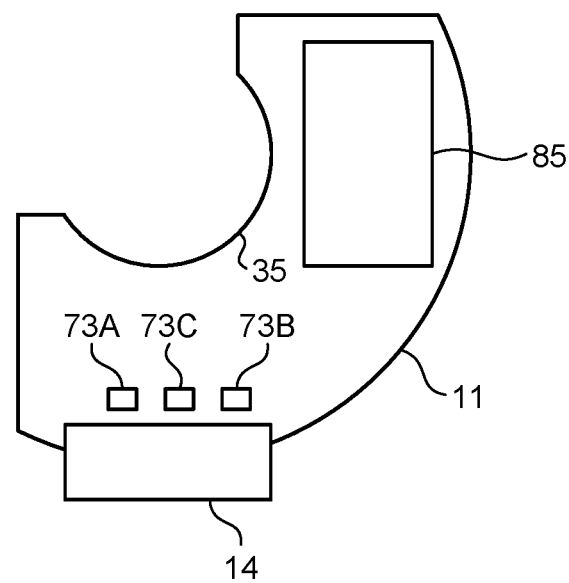
FIG. 10 is a diagram showing a second example of the configuration of the upper surface of the built-in board according to the first embodiment.

FIG. 10 is a diagram showing a second example of the configuration of the upper surface of the built-in board according to the first embodiment. The configuration of the upper surface of the built-in board 11 illustrated in FIG. 5 will be described with reference to FIG. 10. In FIG. 10, a region with a central angle of about 90 degrees on the upper surface of the built-in board 11 is illustrated, and the rest of the upper surface is not illustrated.

A module 85 that supplies power to the winding 22 is disposed on the upper surface of the built-in board 11. The module 85 includes a circuit that executes the function of the power IC 80 and the function of the control unit 70.

The number of electronic parts to be mounted on the built-in board 11 illustrated in FIG. 10 is smaller than the number of electronic parts to be mounted on the built-in board 11 illustrated in FIG. 8. This reduces the area of a region where electronic parts are mounted on the built-in board 11 illustrated in FIG. 10. As a result, the area of the built-in board 11 can be reduced.

Figure 11:
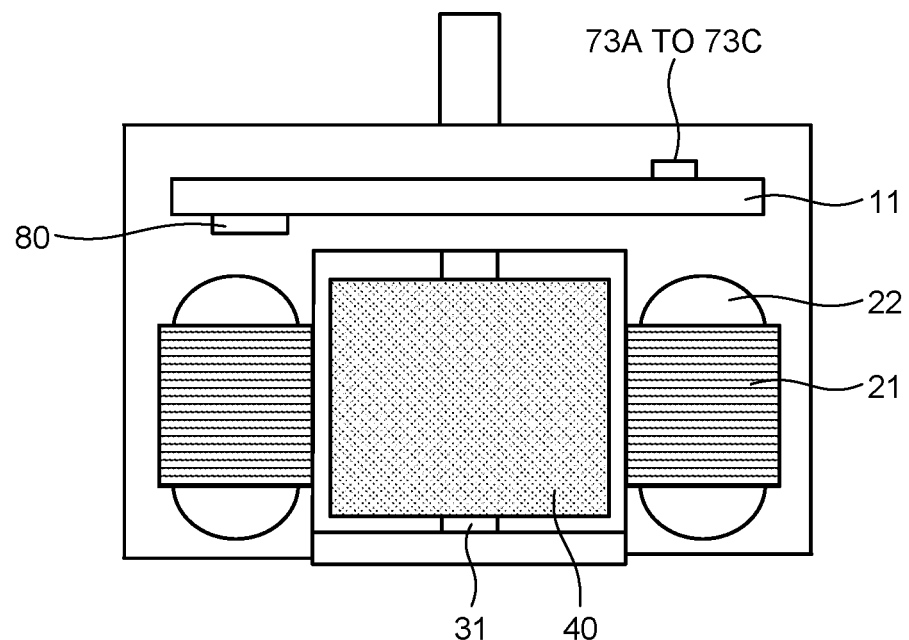
FIG. 11 is a diagram schematically illustrating the inside of the electric motor according to the first embodiment.

Next, a positional relationship between the inductors 73A to 73C and the winding 22 will be described. FIG. 11 is a diagram schematically illustrating the inside of the electric motor according to the first embodiment. FIG. 11 illustrates a cross-sectional configuration of the electric motor 1.

For example, the inductors 73A to 73C are disposed on a surface of the built-in board 11 opposite to a surface thereof facing the winding 22. That is, the inductors 73A to 73C are disposed on a counter-stator side of the built-in board 11. In other words, when the stator cores 21 and the winding 22 are located in such a way as to face a first principal surface of the built-in board 11, the inductors 73A to 73C are disposed on a second principal surface that is a surface of the built-in board 11 opposite to the first principal surface. For example, when the bottom surface of the built-in board 11 faces the stator cores 21 and the winding 22, the inductors 73A to 73C are disposed on the upper surface of the built-in board 11. As a result, the inductors 73A to 73C are less likely to be affected by heat radiated by the winding 22. Therefore, the built-in board 11 can prevent noise removal performance from being changed by a change in an inductance value due to temperature characteristics of the inductors 73A to 73C.

Furthermore, the inductors 73A to 73C are disposed on, for example, a surface of the built-in board 11 opposite to a surface thereof facing the power IC 80. In other words, when the power IC 80 is disposed on the first principal surface of the built-in board 11, the inductors 73A to 73C are disposed on the second principal surface of the built-in board 11. For example, when the power IC 80 is disposed on the bottom surface of the built-in board 11, the inductors 73A to 73C are disposed on the upper surface of the built-in board 11. As a result, the inductors 73A to 73C are less likely to be affected by heat radiated by the power IC 80. Therefore, the built-in board 11 can prevent noise removal performance from being changed by a change in an inductance value due to temperature characteristics of the inductors 73A to 73C.

Figure 12:
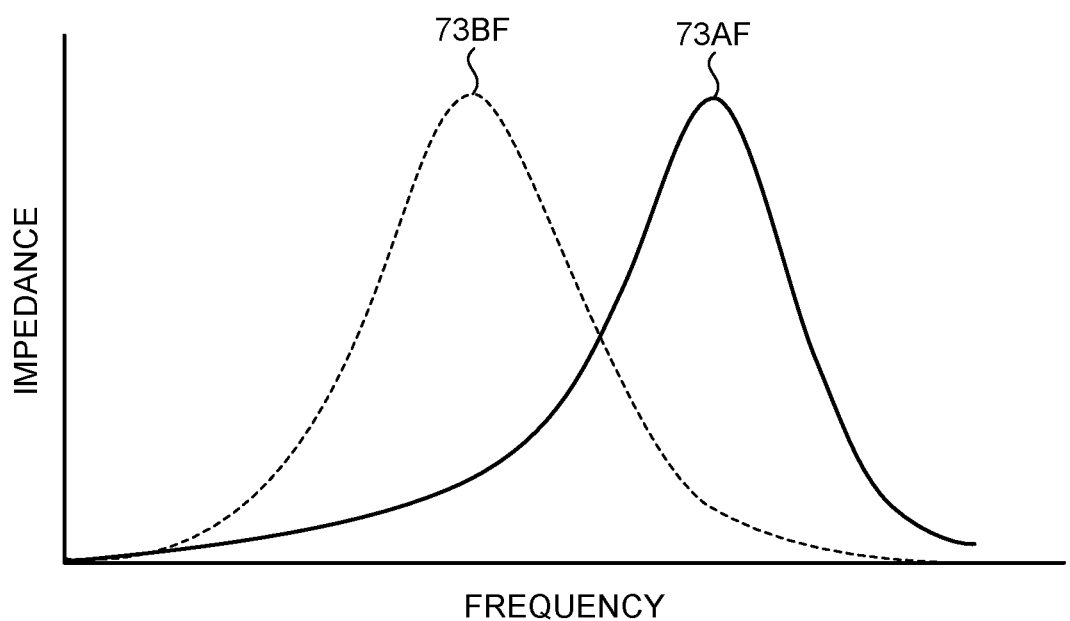
FIG. 12 is a diagram illustrating inductance frequency characteristics of inductors included in the electric motor according to the first embodiment.

Here, the relationship between frequency and impedance regarding the inductors 73A and 73B will be described. FIG. 12 is a diagram illustrating inductance frequency characteristics of inductors included in the electric motor according to the first embodiment. In a graph illustrated in FIG. 12, the horizontal axis represents frequency, and the vertical axis represents impedance. FIG. 12 illustrates an inductance frequency characteristic 73AF of the inductor 73A of the low-voltage power supply 78 and an inductance frequency characteristic 73BF of the inductor 73B of the high-voltage power supply 77.

As illustrated in FIG. 12, the impedance of the inductor 73A of the low-voltage power supply 78 and the impedance of the inductor 73B of the high-voltage power supply 77 are each maximized at a specific frequency. The impedance of the inductor 73A of the low-voltage power supply 78 is maximized at a frequency higher than a frequency at which the impedance of the inductor 73B of the high-voltage power supply 77 is maximized.

The carrier frequency of the control unit 70 is several kilohertz to several tens of kilohertz, and the clock frequency of the control unit 70 is several megahertz to several tens of megahertz. That is, a frequency for use in control using the low-voltage power supply 78 is higher than a frequency for use in control using the high-voltage power supply 77. Therefore, noise reduction effect is further enhanced by use of inductors such that the impedance of the inductor 73A of the low-voltage power supply 78 is maximized at the frequency higher than the frequency at which the impedance of the inductor 73B of the high-voltage power supply 77 is maximized. That is, it is possible to further enhance noise reduction effect by using inductors such that the impedance of the inductor 73A is maximized at the frequency higher than the frequency at which the impedance of the inductor 73B is maximized.

Note that it is possible to use inductors such that the impedance of the inductor 73A is maximized at a frequency lower than the frequency at which the impedance of the inductor 73B is maximized. In addition, it is also possible to use inductors such that the impedance of the inductor 73A and the impedance of the inductor 73B are maximized at the same frequency.

As described above, according to the first embodiment, since the inductor 73A is disposed on the low-voltage power-supply line connecting the low-voltage circuit 72 and the low-voltage power supply 78, the electric motor 1 can sufficiently reduce noise. For example, the circuit of the control unit 70 becomes complicated and the clock frequency is increased, so that the electric motor 1 can sufficiently reduce noise even when a large amount of noise is generated.

Furthermore, when the built-in board 11 controls the inverter 81 while estimating the positions of the magnetic poles of the rotor 30 which is a rotor, the built-in board 11 needs to include a digital circuit. In this case, the clock frequency is 100 times or more the carrier frequency, and thus, noise increases. Even in this case, the electric motor 1 can sufficiently reduce noise by means of the inductor 73A.

In addition, noise increases when the control unit 70 includes a microcomputer that operates with a clock with a high frequency and has many functional blocks. Even in this case, the electric motor 1 can sufficiently reduce noise by means of the inductor 73A.

Furthermore, noise increases when the stator 20 and the built-in board 11 are integrally molded by the molding resin 12. Even in this case, the electric motor 1 can sufficiently reduce noise by means of the inductor 73A.

Second Embodiment

Next, a second embodiment will be described with reference to FIGS. 13 and 14. In the second embodiment, the electric motor 1 described in the first embodiment is applied to an air conditioner.

Figure 13:
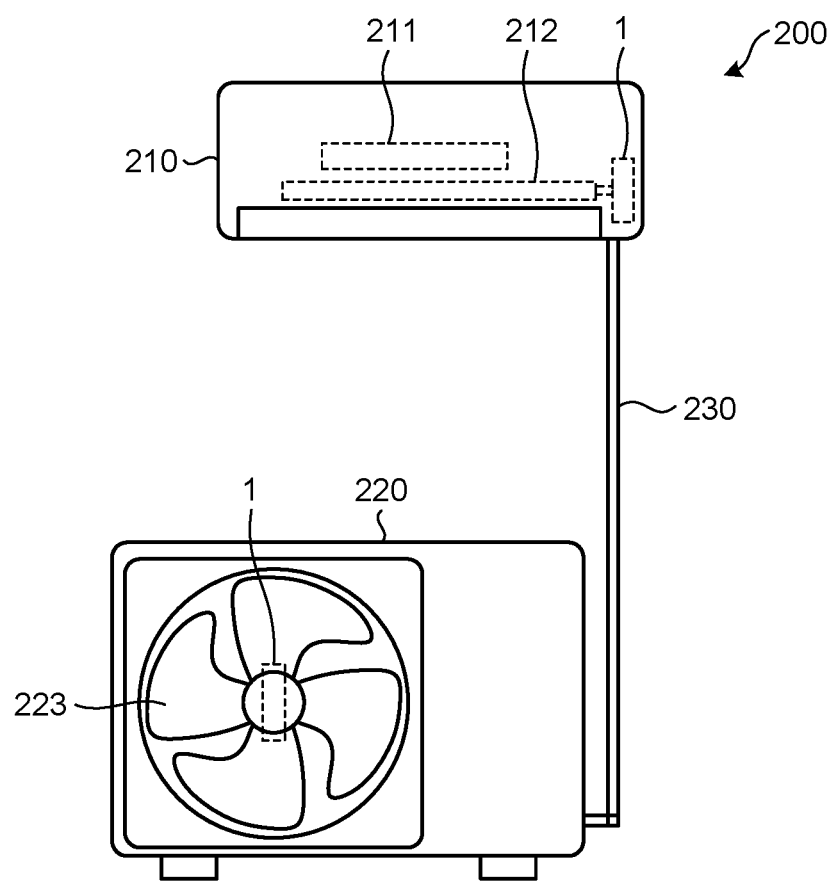
FIG. 13 is a diagram showing a configuration example of an air conditioner according to a second embodiment.
Figure 14:
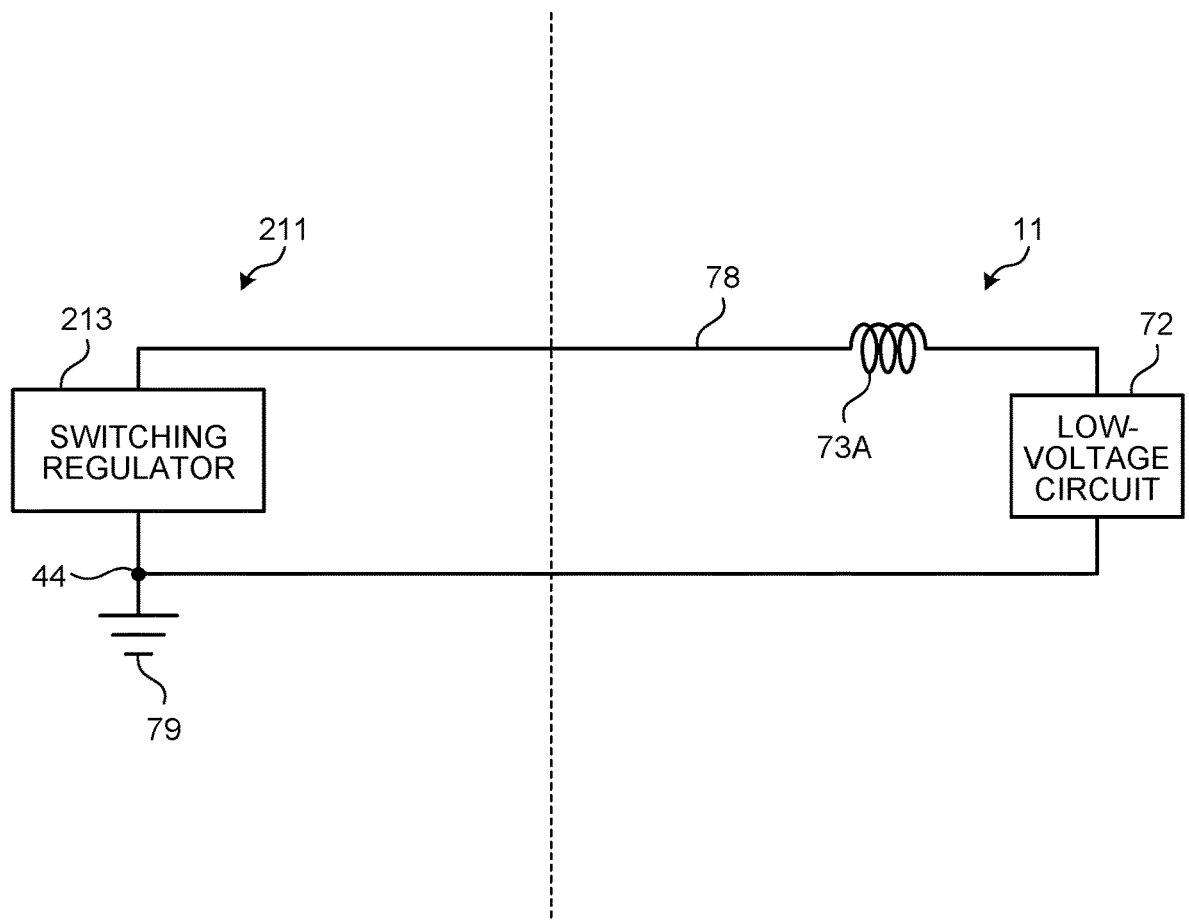
FIG. 14 is a diagram for describing a low-voltage power-supply generation circuit included in an electric motor of the air conditioner according to the second embodiment.

FIG. 13 is a diagram showing a configuration example of an air conditioner according to the second embodiment. An air conditioner 200 includes an indoor unit 210 and an outdoor unit 220 connected to the indoor unit 210 via a refrigerant pipe 230.

The indoor unit 210 is equipped with an indoor-unit blower 212, and the outdoor unit 220 is equipped with an outdoor-unit blower 223. The indoor-unit blower 212 and the outdoor-unit blower 223 each include, as a built-in drive source, the electric motor 1 described in the first embodiment. The electric motor 1 built into the indoor-unit blower 212 is a first electric motor, and the electric motor 1 built into the outdoor-unit blower 223 is a second electric motor.

The indoor-unit blower 212 and the outdoor-unit blower 223 are, for example, Line Flow Fans (registered trademark) (also referred to as transverse-flow blowers or cross-flow fans). Furthermore, the indoor unit 210 includes the indoor-unit board (unit board) 211. For example, the indoor-unit board 211 controls the indoor unit 210.

It is necessary for the indoor unit 210 to increase the widths of a heat exchanger and an air duct as much as possible so as to achieve high efficiency and higher output.

Therefore, a component that is large in width, such as the indoor-unit board 211, cannot be disposed on both sides of the indoor unit 210. Thus, the indoor-unit board 211 is disposed on a front surface of the indoor unit 210.

In the second embodiment, the indoor-unit board 211 is disposed on the front surface of the indoor unit 210. In this case, the lead wire 13 connecting the electric motor 1 and the indoor-unit board 211 becomes long, so that noise increases. In particular, radiation noise to be radiated from the lead wire 13 increases. Even in this case, noise can be reduced by the inductor 73A in the second embodiment. This is because the electric motor 1 including the inductor 73A and the like is built into the indoor unit 210.

Next, a low-voltage power-supply generation circuit that outputs voltage to the low-voltage power supply 78 will be described. FIG. 14 is a diagram for describing a low-voltage power-supply generation circuit included in the electric motor of the air conditioner according to the second embodiment. As described in the first embodiment, the built-in board 11 includes the inductor 73A, the low-voltage circuit 72, the low-voltage power supply 78, and the like. The built-in board 11 is connected to the indoor-unit board 211.

A low-voltage power-supply generation circuit that outputs voltage to the low-voltage power supply 78 is disposed on the indoor-unit board 211. The low-voltage power-supply generation circuit includes, for example, a switching regulator 213. The switching regulator 213 is connected to the low-voltage power supply 78. In addition, the switching regulator 213 is connected to the low-voltage circuit 72 and the ground 79 via a connection point 44. The switching regulator 213 converts an input direct-current voltage into a specific direct-current voltage, and outputs the specific direct-current voltage to the low-voltage power supply 78.

When the low-voltage power-supply generation circuit of the indoor-unit board 211 includes the switching regulator 213, the switching regulator 213 generates a large amount of noise. Even in this case, the electric motor 1 can sufficiently reduce noise by means of the inductor 73A. In this case, the electric motor 1 can improve EMI characteristics corresponding to radio interference, and can also improve electromagnetic susceptibility (EMS) characteristics corresponding to electromagnetic sensitivity. That is, the electric motor 1 can improve an electromagnetic compatibility (EMC) characteristics corresponding to electromagnetic compatibility.

Note that the electric motor 1 can be installed for use not only in the air conditioner 200, but also in, for example, a ventilator, a home appliance, a machine tool, or the like.

As described above, according to the second embodiment, since the electric motor 1 is built into the air conditioner 200, the electric motor 1 can sufficiently reduce noise.

Here, a hardware configuration of the control unit 70 will be described. The control unit 70 is implemented by processing circuitry. The processing circuitry may be a memory and a processor that execute a program stored in the memory, or may be dedicated hardware.

Figure 15:
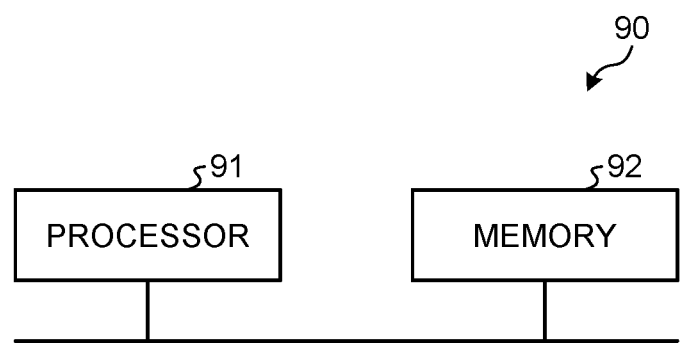
FIG. 15 is a diagram showing a configuration example of processing circuitry to be used in a case where a control unit included in the electric motor according to each of the first and second embodiments is implemented by a processor and a memory.

FIG. 15 is a diagram showing a configuration example of processing circuitry to be used in a case where the control unit included in the electric motor according to each of the first and second embodiments is implemented by a processor and a memory. Processing circuitry 90 illustrated in FIG. 15 serves as the control unit 70, and includes a processor 91 and a memory 92. In a case where the processing circuitry 90 includes the processor 91 and the memory 92, each function of the processing circuitry 90 is implemented by software, firmware, or a combination of software and firmware. The software or firmware is described as a program and stored in the memory 92. In the processing circuitry 90, the processor 91 reads and executes the program stored in the memory 92 to implement each function. That is, the processing circuitry 90 includes the memory 92 for storing a program that causes processing to be performed in the control unit 70. It can also be said that this program is a program for causing the control unit 70 to execute each function to be implemented by the processing circuitry 90. This program may be provided by a storage medium in which the program is stored, or may be provided by other means such as a communication medium.

Examples of the processor 91 include a central processing unit (CPU, also referred to as a processing device, an arithmetic device, a microprocessor, a microcomputer, or a digital signal processor (DSP)) and a system large-scale integration (LSI). Examples of the memory 92 include a random access memory (RAM) and a read only memory (ROM).

Figure 16:
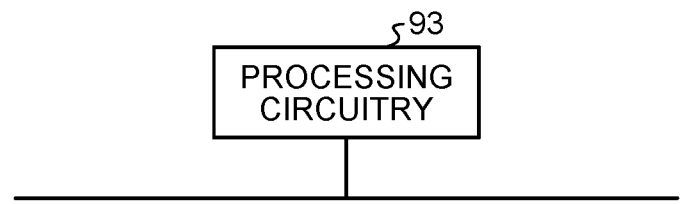
FIG. 16 is a diagram showing an example of processing circuitry to be used in a case where the control unit included in the electric motor according to each of the first and second embodiments is implemented by dedicated hardware.

FIG. 16 is a diagram showing an example of processing circuitry to be used in a case where the control unit included in the electric motor according to each of the first and second embodiments is implemented by dedicated hardware. Processing circuitry 93 illustrated in FIG. 16 corresponds to, for example, a single circuit, a composite circuit, a programmed processor, a parallel-programmed processor, ASIC, Field Programmable Gate Array (FPGA), or a combination thereof. A part of the processing circuitry 93 may be implemented by dedicated hardware, and another part of the processing circuitry 93 may be implemented by software or firmware. As described above, the processing circuitry 93 can implement each of the above-described functions by dedicated hardware, software, firmware, or a combination thereof.

Note that the gate drive circuit 82, the protection circuit 83, a circuit provided on the indoor-unit board 211, and the like can also be implemented by hardware similar to the hardware of the control unit 70.

The configurations set forth in the above embodiments show examples, and it is possible to combine the configurations with another known technique or combine the embodiments with each other, and is also possible to partially omit or change the configurations without departing from the scope of the present disclosure.

The invention claimed is:

1. An electric motor comprising:
a stator;
a rotor; and
a control board to supply current to the stator, wherein the control board includes:
a high-voltage circuit connected to a high-voltage power supply; and
a low-voltage circuit connected to a low-voltage power supply,
the high-voltage circuit includes an inverter to convert an input direct-current voltage into an alternating-current voltage and supply the alternating-current voltage to the stator,
the low-voltage circuit includes a control circuitry to control the inverter, and
a first inductor is disposed on a low-voltage power-supply line that is a line connecting the low-voltage power supply and the low-voltage circuit.

2. The electric motor according to claim 1, wherein the low-voltage circuit includes a digital circuit including a sequential circuit, and
a clock frequency of the digital circuit is 100 times or more a carrier frequency.

3. The electric motor according to claim 1, wherein the control board controls the inverter while estimating positions of magnetic poles of the rotor.

4. The electric motor according to claim 3, wherein the control board controls the inverter by 150-degree conduction control, sine-wave conduction control, phase control, or sensorless control.

5. The electric motor according to claim 1, wherein the control circuitry includes a microcomputer.

6. The electric motor according to claim 1, wherein the control board includes
a second inductor disposed on a high-voltage power-supply line that is a line connecting the high-voltage power supply and the high-voltage circuit.

7. The electric motor according to claim 6, wherein a frequency that maximizes an impedance of the first inductor is higher than a frequency that maximizes an impedance of the second inductor.

8. The electric motor according to claim 6, wherein a frequency that maximizes an impedance of the first inductor is lower than a frequency that maximizes an impedance of the second inductor.

9. The electric motor according to claim 1, wherein the control board and the stator are integrally molded by use of resin.

10. The electric motor according to claim 1, wherein the first inductor is located such that a distance to a lead exit portion is shorter than a distance to an integrated circuit including the inverter, a lead wire being drawn from the lead exit portion.

11. The electric motor according to claim 10, wherein the integrated circuit is disposed on a first principal surface of the control board, and the first inductor is disposed on a second principal surface of the control board, the second principal surface being a surface opposite to the first principal surface.

12. The electric motor according to claim 1, wherein the stator is located in such a way as to face a first principal surface of the control board, and the first inductor is disposed on a second principal surface of the control board, the second principal surface being a surface opposite to the first principal surface.

13. The electric motor according to claim 1, wherein
the low-voltage circuit includes a first circuit included in a drive circuit to drive the inverter, and
the high-voltage circuit includes a second circuit included in the drive circuit.

14. An air conditioner comprising the electric motor according to claim 1.

15. The air conditioner according to claim 14, further comprising:
an indoor unit;
an outdoor unit;
an indoor-unit blower disposed in the indoor unit, the indoor-unit blower being driven by a first electric motor to send air, the first electric motor being included in the electric motor; and
an outdoor-unit blower disposed in the outdoor unit, the outdoor-unit blower being driven by a second electric motor to send air, the second electric motor being included in the electric motor, wherein
the indoor-unit blower and the outdoor-unit blower are Line Flow Fans (registered trademark), and
an indoor-unit board to control the indoor unit is disposed on a front surface of the indoor unit.

16. The air conditioner according to claim 14, further comprising:
a low-voltage power-supply generation circuit to output voltage to the low-voltage power supply, wherein
the low-voltage power-supply generation circuit includes a switching regulator.

17. A control board for supplying current to a stator included in an electric motor, the control board comprising:
a high-voltage circuit connected to a high-voltage power supply; and
a low-voltage circuit connected to a low-voltage power supply, wherein
the high-voltage circuit includes an inverter to convert an input direct-current voltage into an alternating-current voltage and supply the alternating-current voltage to the stator,
the low-voltage circuit includes a control circuitry to control the inverter, and a first inductor is disposed on a low-voltage power-supply line that is a line connecting the low-voltage power supply and the low-voltage circuit.

* * * * *